United States Patent
Yun et al.

(10) Patent No.: US 11,486,736 B2
(45) Date of Patent: Nov. 1, 2022

(54) LINEAR VARIABLE DIFFERENTIAL TRANSFORMER

(71) Applicant: Daegu Gyeongbuk Institute of Science and Technology, Daegu (KR)

(72) Inventors: Dong Won Yun, Daejeon (KR); Jeon Il Moon, Seongnam-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 489 days.

(21) Appl. No.: 16/628,224

(22) PCT Filed: May 9, 2018

(86) PCT No.: PCT/KR2018/005315
§ 371 (c)(1),
(2) Date: Jan. 29, 2020

(87) PCT Pub. No.: WO2019/009513
PCT Pub. Date: Jan. 10, 2019

(65) Prior Publication Data
US 2020/0378800 A1      Dec. 3, 2020

(30) Foreign Application Priority Data

Jul. 4, 2017 (KR) .......................... 10-2017-0084987
Apr. 26, 2018 (KR) .......................... 10-2018-0048479

(51) Int. Cl.
*H01F 27/32* (2006.01)
*G01D 5/22* (2006.01)
*H01F 17/04* (2006.01)

(52) U.S. Cl.
CPC ......... *G01D 5/2291* (2013.01); *H01F 17/045* (2013.01); *H01F 27/325* (2013.01)

(58) Field of Classification Search
CPC ... G01D 5/2291; H01F 17/045; H01F 27/325; H01F 7/121; H01F 7/16; H01F 27/28; G01B 7/00
See application file for complete search history.

(56) References Cited

U.S. PATENT DOCUMENTS

| 1,912,389 A | * | 6/1933 | Smith | ................. H01F 30/10 336/185 |
| 3,138,772 A | * | 6/1964 | Persons, Jr. | ............. H01F 29/10 336/136 |

(Continued)

FOREIGN PATENT DOCUMENTS

| DE | 102015210856 A1 | * | 12/2016 | ........... H01F 17/045 |
| EP | 3093859 | | 11/2016 | |

(Continued)

OTHER PUBLICATIONS

JPO, Office Action of JP 2019-572464 dated Feb. 24, 2021.
EPO, Supplementary European Search Report of EP 18828073.9 dated Oct. 27, 2020.

*Primary Examiner* — Tuyen T Nguyen
(74) *Attorney, Agent, or Firm* — Lex IP Meister, PLLC

(57) ABSTRACT

A linear variable differential transformer includes: a moving portion having a shape extending in a direction of an axial line; a bobbin including a through hole formed such that the moving portion is movable in the direction of the axial line, an outer circumferential surface of the bobbin having a shape inclined symmetrically with respect to a center line thereof based on the direction of the axial line; a primary coil wound around the outer circumferential surface of the bobbin; and a secondary coil wound around the wound primary coil, a wound outer surface of the secondary coil having a shape parallel to the axial line.

13 Claims, 9 Drawing Sheets

(56) References Cited

U.S. PATENT DOCUMENTS

| | | | | |
|---|---|---|---|---|
| 4,388,568 A * | 6/1983 | Goseberg | ............... | H01F 38/42 |
| | | | | 315/411 |
| 4,406,978 A * | 9/1983 | Goseberg | ............... | H01F 38/42 |
| | | | | 315/411 |
| 4,684,912 A * | 8/1987 | Kiltie | ..................... | H01F 38/12 |
| | | | | 336/185 |
| 4,694,246 A | 9/1987 | Avisse | | |
| 2007/0052507 A1 * | 3/2007 | Zaitsu | .................. | H01F 41/098 |
| | | | | 335/216 |
| 2017/0153126 A1 | 6/2017 | Wu et al. | | |

FOREIGN PATENT DOCUMENTS

| | | |
|---|---|---|
| FR | 3002321 | 8/2014 |
| JP | 49-056418 | 4/1977 |
| JP | 58-006212 | 1/1983 |
| JP | 2012-073135 | 4/2012 |
| WO | 2014125236 | 8/2014 |
| WO | WO-2014125236 A1 * | 8/2014 ........... G01D 5/2258 |

\* cited by examiner

LINEAR VARIABLE DIFFERENTIAL TRANSFORMER

TECHNICAL FIELD

The present disclosure relates to a linear variable differential transformer.

BACKGROUND ART

Linear variable differential transformers are displacement sensors used to measure displacements of systems.

Linear variable differential transformers operate on the principle of transformers and may provide excellent sensitivity and obtain accurate measurement results. Also, linear variable differential transformers may be implemented in a small size and light weight, may be used in a general environment without limitations such as temperature and humidity, and has a good sealing effect when used in a liquid or gas environment.

A structure of a conventional linear variable differential transformer is illustrated in FIG. 1.

As illustrated in FIG. 1, the conventional linear variable differential transformer 10 includes a moving portion 11 made of a ferromagnetic material, a bobbin 12 provided such that the moving portion 11 is slidable, a primary coil 13 wound around an outer circumferential surface of the bobbin 12, and a secondary coil 14 wound around the primary coil 13. The conventional linear variable differential transformer 10 measures the displacement of the moving portion 11 based on a voltage difference occurring according to the movement of the moving portion 11.

In the case of the conventional linear variable differential transformer 10, the primary coil 13 is wound around the bobbin 12 to a constant thickness, but the secondary coil 14 has a shape in which the wound thickness thereof is changed from a center line C of the bobbin 12 toward an edge E of the bobbin 12.

The wound shape of the secondary coil 14 is for reducing an end effect of the edge or the like. Since the wound thickness of the secondary coil 14 has to be changed at a certain ratio toward the edge E of the bobbin 12, a manufacturing process thereof is difficult. Therefore, the production rate and manufacturing yield of products have been greatly influenced by the skill of workers who manufacture the products.

DESCRIPTION OF EMBODIMENTS

Technical Problem

According to an aspect of the present disclosure, a main object is to implement a linear variable differential transformer having a structure capable of improving production efficiency at the time of manufacturing.

Solution to Problem

According to an aspect of the present disclosure, a linear variable differential transformer includes: a moving portion having a shape extending in a direction of an axial line; a bobbin including a through hole formed such that the moving portion is movable in the direction of the axial line, an outer circumferential surface of the bobbin having a shape inclined symmetrically with respect to a center line thereof based on the direction of the axial line; a primary coil wound around the outer circumferential surface of the bobbin; and a secondary coil wound around the wound primary coil, a wound outer surface of the secondary coil having a shape parallel to the axial line.

According to another aspect of the present disclosure, a linear variable differential transformer includes: a moving portion having a shape extending in a direction of an axial line; a bobbin including a through hole formed such that the moving portion is movable in the direction of the axial line, an outer circumferential surface of the bobbin having a shape inclined symmetrically with respect to a center line thereof based on the direction of the axial line; a primary coil wound around a middle portion of the outer circumferential surface of the bobbin, a wound outer surface of the primary coil having a shape parallel to the axial line; and a secondary coil wound around portions of the outer circumferential surface of the bobbin, which are located at both sides of the primary coil, a wound outer surface of the secondary coil having a shape parallel to the axial line.

Advantageous Effects of Disclosure

According to an aspect of the present disclosure, there is an effect that provides a linear variable differential transformer having a structure capable of improving production efficiency at the time of manufacturing.

BEST MODE

Figure 1:
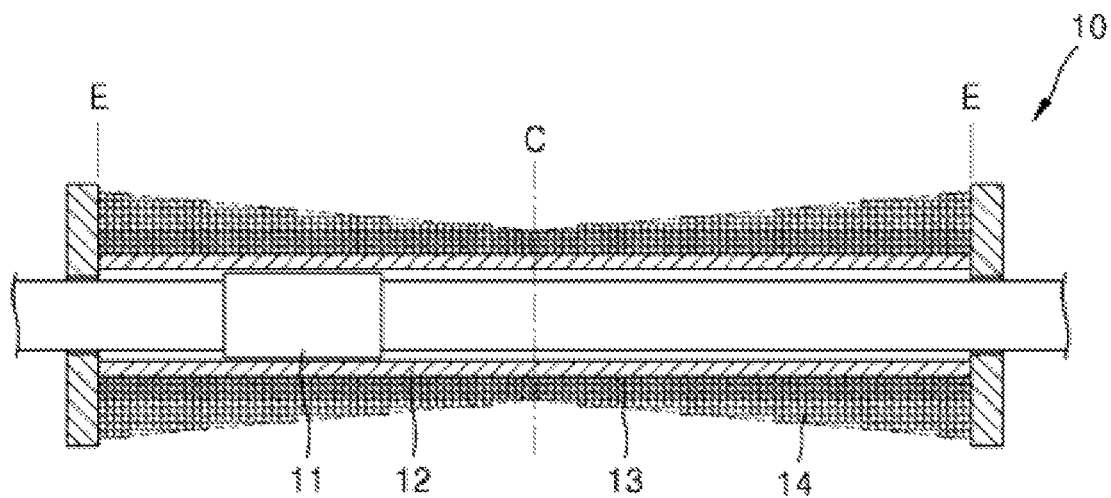
FIG. 1 is a schematic view illustrating a cross-section of a conventional linear variable differential transformer.

According to an aspect of the present disclosure, a linear variable differential transformer includes: a moving portion having a shape extending in a direction of an axial line; a bobbin including a through hole formed such that the moving portion is movable in the direction of the axial line, an outer circumferential surface of the bobbin having a shape inclined symmetrically with respect to a center line thereof based on the direction of the axial line; a primary coil wound around the outer circumferential surface of the bobbin; and a secondary coil wound around the wound primary coil, a wound outer surface of the secondary coil having a shape parallel to the axial line.

One of the primary coil and the secondary coil may be wound to a constant thickness over an entire length of the bobbin, and a shape of an inner surface of the other of the primary coil and the secondary coil facing the bobbin may be inclined symmetrically with respect to a center line thereof based on the direction of the axial line.

A shape of the outer circumferential surface of the bobbin may be formed such that a diameter of a portion thereof through which the center line passes is largest.

The primary coil may be wound to a constant thickness over the entire length of the bobbin.

A shape of the outer circumferential surface of the bobbin may be formed such that a diameter thereof is increased as a distance from the center line is increased.

A shape of a wound outer surface of the primary coil may be parallel to the axial line.

The secondary coil may be wound to a constant thickness over the entire length of the bobbin.

According to another aspect of the present disclosure, a linear variable differential transformer includes: a moving portion having a shape extending in a direction of an axial line; a bobbin including a through hole formed such that the moving portion is movable in the direction of the axial line, an outer circumferential surface of the bobbin having a shape inclined symmetrically with respect to a center line thereof based on the direction of the axial line; a primary coil wound around a middle portion of the outer circumferential surface of the bobbin, a wound outer surface of the primary coil having a shape parallel to the axial line; and a secondary coil wound around portions of the outer circumferential surface of the bobbin, which are located at both sides of the primary coil, a wound outer surface of the secondary coil having a shape parallel to the axial line.

A shape of the outer circumferential surface of the bobbin may be formed such that a diameter of a portion thereof through which the center line passes is largest.

A shape of an inner surface of the primary coil facing the bobbin may be inclined symmetrically with respect to a center line thereof based on the direction of the axial line.

A shape of an inner surface of the secondary coil facing the bobbin may be inclined symmetrically with respect to a center line thereof based on the direction of the axial line.

A shape of the outer circumferential surface of the bobbin may be formed such that a diameter thereof is increased as a distance from the center line is increased.

A shape of an inner surface of the primary coil facing the bobbin may be inclined symmetrically with respect to a center line thereof based on the direction of the axial line.

A shape of an inner surface of the secondary coil facing the bobbin may be inclined symmetrically with respect to a center line thereof based on the direction of the axial line.

The wound outer surface of the primary coil and the wound outer surface of the secondary coil may be located at the same distance from the axial line.

MODE OF DISCLOSURE

Hereinafter, preferred embodiments of the present disclosure will be described in detail with reference to the accompanying drawings. Also, in the present specification and drawings, elements having substantially the same structure are dented by the same reference numerals, a redundant description thereof will be omitted.

Hereinafter, a linear variable differential transformer 100 according to a first embodiment of the present disclosure will be described with reference to FIGS. 2 and 3.

Figure 2:
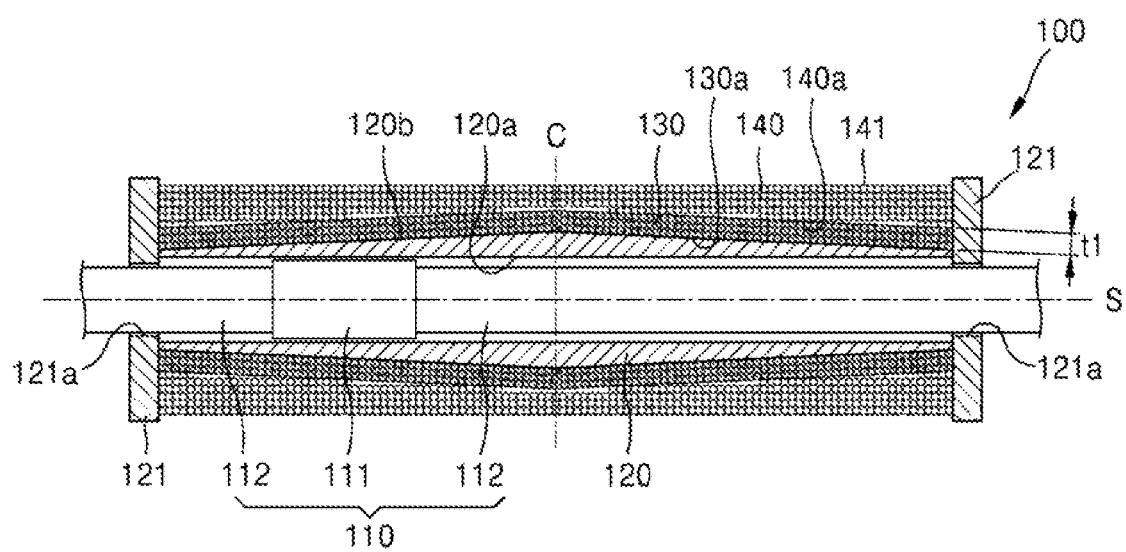
FIG. 2 is a schematic cross-sectional view of a linear variable differential transformer according to a first embodiment of the present disclosure.
Figure 3:
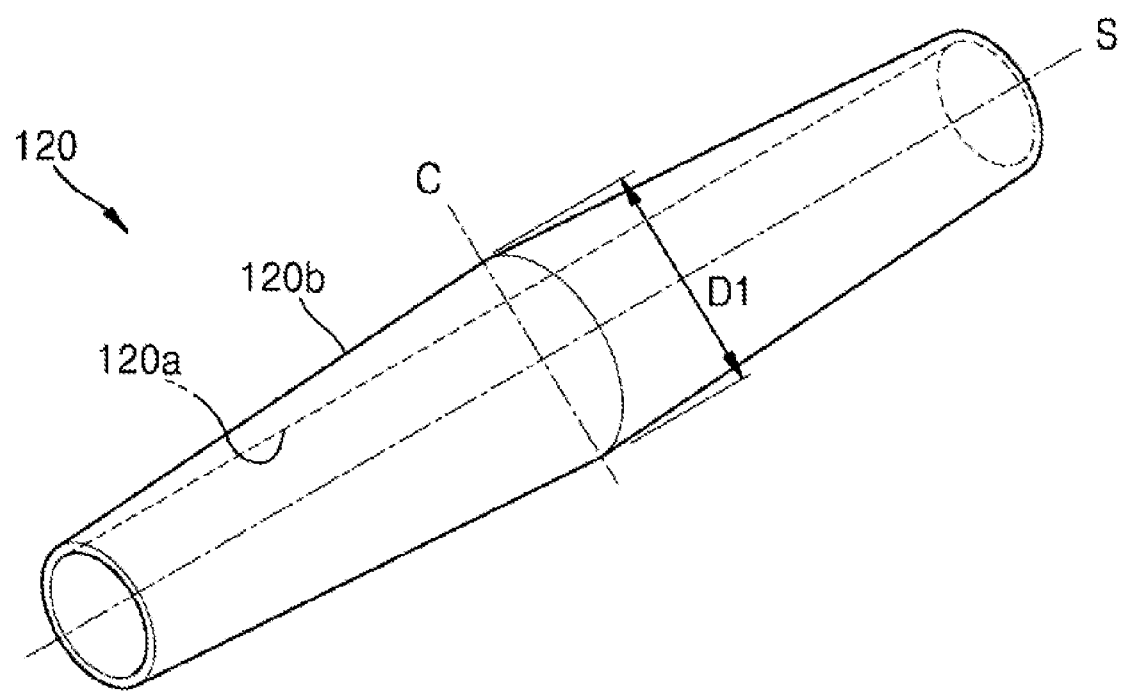
FIG. 3 is a schematic perspective view of a bobbin of the linear variable differential transformer according to the first embodiment of the present disclosure.

FIG. 2 is a schematic cross-sectional view of the linear variable differential transformer according to the first embodiment of the present disclosure, and FIG. 3 is a schematic perspective view of a bobbin of the linear variable differential transformer according to the first embodiment of the present disclosure.

As illustrated in FIG. 2, the linear variable differential transformer 100 according to the first embodiment of the present disclosure includes a moving portion 110, a bobbin 120, a primary coil 130, and a secondary coil 140.

The moving portion 110 includes a core 111 and a core rod 112 and has a rod shape extending in a direction of an axial line S as a whole and having a circular cross-section.

The moving portion 110 according to the first embodiment has the rod shape having the circular cross-section, but the present disclosure is not limited thereto. That is, the shape of the moving portion according to the present disclosure may be variously modified. For example, the moving portion according to the present disclosure may have a beam shape having a rectangular cross-section, or may have a rod shape having an elliptical cross-section.

The core 111 includes a ferromagnetic material and causes electromagnetic interaction with the primary coil 130 and the secondary coil 140.

The core rod 112 supports the core 111. Since a diameter of the core rod 112 is less than a diameter of the core 111, the core rod 112 is configured to slide through a moving hole 121*a* of a support plate 121.

The bobbin 120 guides the movement of the moving portion 110. To this end, a through hole 120*a* is formed in the direction of the axial line S such that the moving portion 110 is movable in the direction of the axial line S. That is, at least a part of the moving portion 110 is accommodated in the through hole 120*a* so as to be slidable.

Also, the primary coil 130 is wound around an outer circumferential surface 120*b* of the bobbin 120, and plate-shaped support plates 121 are provided at both ends of the bobbin 120.

The moving hole 121*a* is formed in the support plate 121, and an inner diameter of the moving hole 121*a* is less than an inner diameter of the through hole 120*a*. Therefore, the core 111 does not move through the moving hole 121*a*, but the core rod 112 is configured to be movable through the moving hole 121*a*.

According to the first embodiment, the moving holes 121*a* are formed in all the support plates 121 of the bobbin 120, but the present disclosure is not limited thereto. That is, according to the present disclosure, the moving hole may be formed in only one of the support plates of the bobbin. In this case, the movement of the moving portion is limited by the supporting plates in which the moving hole is not formed.

As illustrated in FIG. 3, the outer circumferential surface 120*b* of the bobbin 120 has a shape inclined symmetrically with respect to the center line C based on the direction of the axial line S. The center line C is perpendicular to the axial line S.

In particular, the shape of the outer circumferential surface 120*b* of the bobbin 120 according to the first embodiment is formed such that a diameter D1 of a portion of the bobbin 120 through which the center line C passes is the largest.

The bobbin 120 according to the first embodiment is configured such that the diameter D1 of the portion of the bobbin 120 through which the center line C passes is the largest, but the present disclosure is not limited thereto. That is, the outer circumferential surface of the bobbin according to the present disclosure may have various shapes.

The primary coil 130 is wound around the outer circumferential surface 120b of the bobbin 120, such that the primary coil 130 is wound to a constant thickness t1 over the entire length of the bobbin 120.

That the wound thickness t1 of the primary coil 130 is constant means that the thickness of the primary coil 130 is substantially constant and also includes a case in which there is a slight change in the thickness of the primary coil 130. The primary coil 130 is actually formed by winding a wire. Therefore, there may be a slight change in the thickness during a winding process and the wound surface of the primary coil 130 is also slightly uneven due to the shape of the wire.

Due to the wound shape of the primary coil 130 and the shape of the bobbin 120, a shape of an inner surface 130a of the primary coil 130 facing the bobbin 120 has a shape inclined symmetrically with respect to the center line C based on the direction of the axial line S.

The secondary coil 140 is wound on the wound primary coil 130, and a wound outer surface 141 of the secondary coil 140 has a shape parallel to the axial line S.

That the outer surface 141 of the secondary coil 140 has a shape parallel to the axial line S means that the outer surface 141 of the secondary coil 140 is substantially parallel to the axial line S and also includes a case in which there is a slight change in the position of the outer surface 141 of the secondary coil 140. The secondary coil 140 is actually formed by winding a wire. Therefore, there may be a slight change with respect to parallel configuration during a winding process and the wound surface of the secondary coil 140 is also slightly uneven due to the shape of the wire.

Due to the wound shape of the secondary coil 140 and the shape of the bobbin 120, a shape of an inner surface 140a of the secondary coil 140 facing the bobbin 120 has a shape inclined symmetrically with respect to the center line C based on the direction of the axial line S.

In the case of the secondary coil 140, as a distance from the center line C of the bobbin 120 is increased, the wound thickness of the secondary coil 140 is designed to be gradually increased (designed such that the wire is more wound), so as to increase the accuracy of the displacement measurement of the moving portion 110 by reducing the end effect of the edge. That is, as a distance from the center line C of the bobbin 120 is increased, a ratio of the thickness of the secondary coil 140 to the thickness of the primary coil 130 is designed to be gradually increased.

However, in the first embodiment, the shape of the outer circumferential surface 120b of the bobbin 120 is designed such that the diameter of the portion of the bobbin 120 through which the center line C passes is the largest, and the primary coil 130 is wound to the constant thickness t1 over the entire length of the bobbin 120. Therefore, when a worker winds the secondary coil 140 so that the outer surface 141 thereof is wound to have a shape parallel to the axial line S, the wound thickness of the secondary coil 140 is increased as a distance from the center line C of the bobbin 120 is increased, thereby reducing the end effect.

According to the first embodiment, no insulating members are present between the bobbin 120 and the primary coil 130 and between the primary coil 130 and the secondary coil 140, but the present disclosure is not limited thereto. That is, according to the present disclosure, additional insulating members may be present between the bobbin 120 and the primary coil 130 and between the primary coil 130 and the secondary coil 140.

Since configurations other than the configuration of the linear variable differential transformer 100 described above may use the configuration of the known linear variable differential transformer as it is, a detailed description thereof will be omitted.

Hereinafter, a process of manufacturing the linear variable differential transformer 100 according to the first embodiment of the present disclosure will be described.

First, a manufacturer prepares the moving portion 110 having the core 111 and the core rod 112. After the core 111 is located inside the through hole 120a of the bobbin 120, the support plates 121 are provided at both ends of the bobbin 120.

Subsequently, the manufacturer winds the primary coil 130 around the outer circumferential surface 120b of the bobbin 120, such that the primary coil 130 is wound to the constant thickness t1 over the entire length of the bobbin 120.

After winding the primary coil 130, the manufacturer winds the secondary coil 140 on the wound primary coil 130.

When the secondary coil 140 is wound, the wound outer surface 141 of the secondary coil 140 has to have a shape parallel to the axial line S. Therefore, a worker winds the secondary coil 140 while checking whether the outer surface 141 of the secondary coil 140 being wound is parallel to the axial line S. There are many methods capable of knowing whether the outer surface 141 of the secondary coil 140 being wound is parallel to the axial line S. For example, it may be checked by determining "whether the diameter of the outer surface 141 of the secondary coil 140 is constant over the entire length of the bobbin 120" by measuring the diameter of the outer surface 141 of the secondary coil 140 with a measuring tool such as a vernier caliper during the operation of winding the secondary coil 140. That is, when the diameter of the outer surface 141 of the secondary coil 140 is constant over the entire length of the bobbin 120, the outer surface 141 of the secondary coil 140 is naturally parallel to the axial line S due to a geometric structure. Also, as another example, "whether the outer surface 141 of the secondary coil 140 being wound is parallel to the axial line S" may be checked by using a tool that measures parallel configuration or by taking images or photographs in real time.

According to the first embodiment, after the moving portion 110 is provided in the bobbin 120, the linear variable differential transformer 100 is manufactured by sequentially winding the primary coil 130 and the secondary coil 140. However, the present disclosure is not limited thereto. That is, according to the present disclosure, after the primary coil 130 and the secondary coil 140 are wound around the bobbin 120, the moving portion 110 may be provided in the bobbin 120.

Hereinafter, the operation of the linear variable differential transformer 100 according to the first embodiment of the present disclosure will be described.

When the moving portion 110 moves in a state in which an AC voltage is applied to the primary coil 130 at the time of operation, the core 111 causes a voltage difference to occur at both ends of the secondary coil 140. Since the voltage difference is proportional to the displacement of the moving portion 110, a controller (not illustrated) measures the displacement of the moving portion 110 by using the voltage difference.

As described above, in the linear variable differential transformer 100 according to the first embodiment, the outer circumferential surface 120b of the bobbin 120 is formed in a shape inclined symmetrically with respect to the center line C. Therefore, even when the wound thickness of the secondary coil 140 is changed in the direction of the axial line S at the time of winding the secondary coil 140, the worker may easily make the outer surface 141 of the secondary coil 140 in a shape parallel to the axial line S. That is, when the worker winds the secondary coil 140, the worker has only to wind the secondary coil 140 such that the outer surface 141 of the secondary coil 140 is wound in parallel to the axial line S. Therefore, the worker may quickly and easily perform the operation of winding the secondary coil 140. That is, in the process of winding the secondary coil 140 of the linear variable differential transformer 100, the secondary coil 140 may be wound accurately and easily regardless of the skill of workers, thereby implementing high manufacturing process efficiency and high manufacturing yield.

Hereinafter, a linear variable differential transformer 200 according to a second embodiment of the present disclosure will be described with reference to FIGS. 4 and 5.

Figure 4:
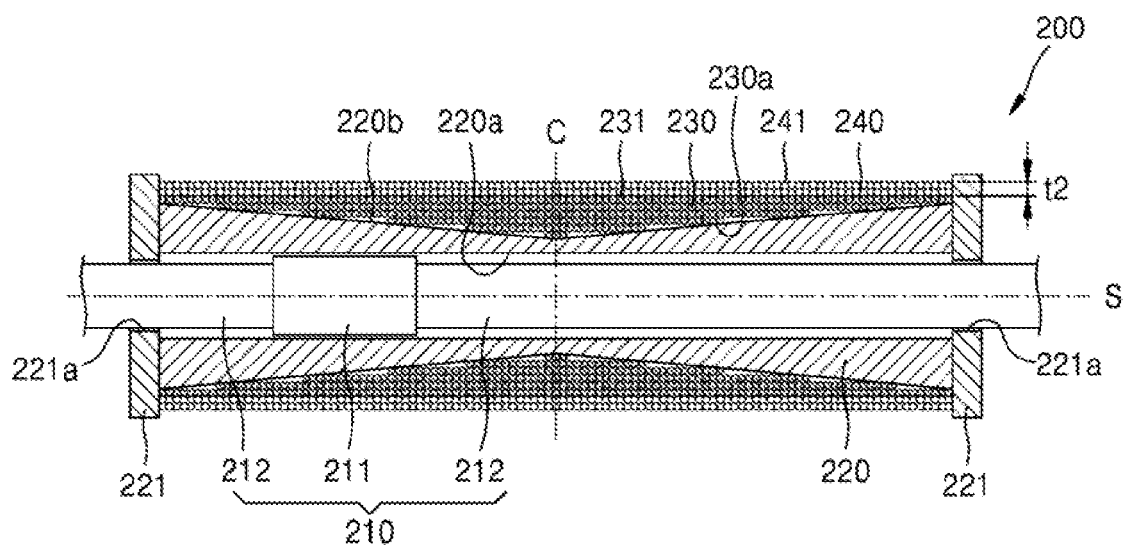
FIG. 4 is a schematic cross-sectional view of a linear variable differential transformer according to a second embodiment of the present disclosure.
Figure 5:
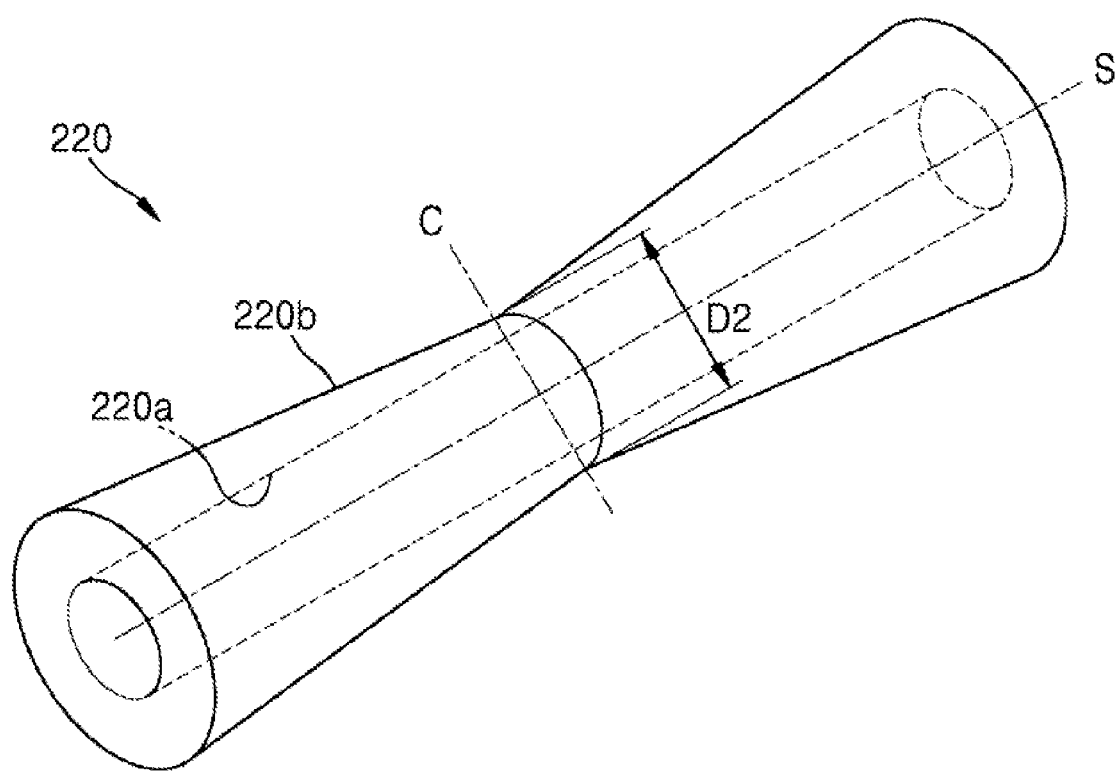
FIG. 5 is a schematic perspective view of a bobbin of the linear variable differential transformer according to the second embodiment of the present disclosure.

FIG. 4 is a schematic cross-sectional view of the linear variable differential transformer according to the second embodiment of the present disclosure, and FIG. 5 is a schematic perspective view of a bobbin of the linear variable differential transformer according to the second embodiment of the present disclosure.

As illustrated in FIG. 4, the linear variable differential transformer 200 according to the second embodiment of the present disclosure includes a moving portion 210, a bobbin 220, a primary coil 230, and a secondary coil 240.

The moving portion 210 includes a core 211 and a core rod 212 and has a rod shape extending in a direction of an axial line S as a whole and having a circular cross-section.

The moving portion 210 according to the second embodiment has the rod shape having the circular cross-section, but the present disclosure is not limited thereto. That is, the shape of the moving portion according to the present disclosure may be variously modified. For example, the moving portion according to the present disclosure may have a beam shape having a rectangular cross-section, or may have a rod shape having an elliptical cross-section.

The core 211 includes a ferromagnetic material and causes electromagnetic interaction with the primary coil 230 and the secondary coil 240.

The core rod 212 supports the core 211. Since a diameter of the core rod 212 is less than a diameter of the core 211, the core rod 212 is configured to slide through a moving hole 221a of a support plate 221.

The bobbin 220 guides the movement of the moving portion 210. To this end, a through hole 220a is formed in the direction of the axial line S such that the moving portion 210 is movable in the direction of the axial line S. That is, at least a part of the moving portion 210 is accommodated in the through hole 220a so as to be slidable.

In addition, the primary coil 230 is wound around an outer circumferential surface 220b of the bobbin 220, and plate-shaped support plates 221 are provided at both ends of the bobbin 220.

The moving hole 221a is formed in the support plate 221, and an inner diameter of the moving hole 221a is less than an inner diameter of the through hole 220a. Therefore, the core 211 does not move through the moving hole 221a, but the core rod 212 is configured to be movable through the moving hole 221a.

According to the second embodiment, the moving holes 221a are formed in all the support plates 221 of the bobbin 220, but the present disclosure is not limited thereto. That is, according to the present disclosure, the moving hole may be formed in only one of the support plates of the bobbin. In this case, the movement of the moving portion is limited by the supporting plates in which the moving hole is not formed.

As illustrated in FIG. 5, the outer circumferential surface 220b of the bobbin 220 has a shape inclined symmetrically with respect to the center line C based on the direction of the axial line S. The center line C is perpendicular to the axial line S.

In particular, the shape of the outer circumferential surface 220b of the bobbin 220 according to the second embodiment is formed such that a diameter D2 of a portion of the bobbin 220 through which the center line C passes is the smallest. That is, the shape of the outer circumferential surface 220b of the bobbin 220 is configured such that a diameter thereof is increased as a distance from the center line C is increased. Therefore, the bobbin 220 has a double-headed drum with a narrow waist in the middle as a whole.

The bobbin 220 according to the second embodiment is configured such that the diameter D2 of the portion of the bobbin 220 through which the center line C passes is the smallest, but the present disclosure is not limited thereto. That is, the outer circumferential surface of the bobbin according to the present disclosure may have various shapes.

The primary coil 230 is wound around the outer circumferential surface 220b of the bobbin 220, such that the wound outer surface 231 of the primary coil 230 has a shape parallel to the axial line S.

That the outer surface 231 of the primary coil 230 has a shape parallel to the axial line S means that the outer surface 231 of the primary coil 230 is substantially parallel to the axial line S and also includes a case in which there is a slight change in the position of the outer surface 231 of the primary coil 230. The primary coil 230 is actually formed by winding a wire. Therefore, there may be a slight change with respect to parallel configuration during a winding process and the wound surface of the primary coil 230 is also slightly uneven due to the shape of the wire.

Due to the wound shape of the primary coil 230 and the shape of the bobbin 220, a shape of an inner surface 230a of the primary coil 230 facing the bobbin 220 has a shape inclined symmetrically with respect to the center line C based on the direction of the axial line S.

In the case of the primary coil 230, as a distance from the center line C of the bobbin 120 is increased, the wound thickness of the primary coil 230 is designed to be gradually decreased (designed such that the wire is less wound), so as to increase the accuracy of the displacement measurement of the moving portion 110 by reducing the end effect of the edge. That is, as a distance from the center line C of the bobbin 220 is increased, a ratio of the thickness of the primary coil 230 to the thickness of the secondary coil 240 is designed to be gradually decreased.

In the second embodiment, the shape of the outer circumferential surface 220b of the bobbin 220 is designed such that a diameter of a portion of the bobbin 220 through which the center line C passes is the smallest. Therefore, when the worker winds the primary coil 230 such that the outer surface 231 thereof is wound in a shape parallel to the axial line S and winds the secondary coil 240 to a constant thickness t2 over the entire length of the bobbin 220, a ratio of the thickness of the secondary coil 240 to the thickness of the primary coil 230 is gradually increased as a distance from the center line C of the bobbin 220 is increased, thereby reducing the end effect.

The secondary coil 240 is wound on the wound primary coil 230, such that the secondary coil 240 is wound to the constant thickness t2 over the entire length of the bobbin 120. Since the wound outer surface 231 of the primary coil 230 has a shape parallel to the axial line S and the wound thickness t2 of the secondary coil 240 is constant, the wound outer surface 241 of the secondary coil 240 also has a shape parallel to the axial line S.

That the wound thickness t2 of the secondary coil 240 is constant means that the thickness of the secondary coil 240 is substantially constant and also includes a case in which there is a slight change in the thickness of the secondary coil 240. The secondary coil 240 is actually formed by winding a wire. There may be a slight change in the thickness during a winding process and the wound surface of the secondary coil 240 is also slightly uneven due to the shape of the wire.

Also, that the outer surface 241 of the secondary coil 240 has a shape parallel to the axial line S means that the outer surface 241 of the secondary coil 240 is substantially parallel to the axial line S and also includes a case in which there is a slight change in the position of the outer surface 241 of the secondary coil 240. The secondary coil 240 is actually formed by winding a wire. Therefore, there may be a slight change with respect to parallel configuration during a winding process and the wound surface of the secondary coil 240 is also slightly uneven due to the shape of the wire.

According to the second embodiment, no insulating members are present between the bobbin 220 and the primary coil 230 and between the primary coil 230 and the secondary coil 240, but the present disclosure is not limited thereto. That is, according to the present disclosure, additional insulating members may be present between the bobbin 220 and the primary coil 230 and between the primary coil 230 and the secondary coil 240.

Since configurations other than the configuration of the linear variable differential transformer 200 described above may use the configuration of the known linear variable differential transformer as it is, a detailed description thereof will be omitted.

Hereinafter, a process of manufacturing the linear variable differential transformer 200 according to the second embodiment of the present disclosure will be described.

First, a manufacturer prepares the moving portion 210 having the core 211 and the core rod 212. After the core 211 is located inside the through hole 220a of the bobbin 220, the support plates 221 are provided at both ends of the bobbin 220.

Subsequently, the manufacturer winds the primary coil 230 around the outer circumferential surface 220b of the bobbin 220. When the primary coil 230 is wound, the wound outer surface 231 of the primary coil 230 has to have a shape parallel to the axial line S. Therefore, a worker winds the primary coil 230 while checking whether the outer surface 231 of the primary coil 230 being wound is parallel to the axial line S. There are many methods capable of knowing whether the outer surface 231 of the primary coil 230 being wound is parallel to the axial line S. For example, it may be checked by determining "whether the diameter of the outer surface 231 of the primary coil 230 is constant over the entire length of the bobbin 220" by measuring the diameter of the outer surface 231 of the primary coil 230 with a measuring tool such as a vernier caliper during the operation of winding the primary coil 230. That is, when the diameter of the outer surface 231 of the primary coil 230 is constant over the entire length of the bobbin 220, the outer surface 231 of the primary coil 230 is naturally parallel to the axial line S due to a geometric structure. Also, as another example, "whether the outer surface 231 of the primary coil 230 being wound is parallel to the axial line S" may be checked by using a tool that measures parallel configuration or by taking images or photographs in real time.

Subsequently, the manufacturer winds the secondary coil 240 on the wound primary coil 230.

When the secondary coil 240 is wound, the secondary coil 240 is wound to the constant thickness t2 over the entire length of the bobbin 220. In addition, when the secondary coil 240 is wound, the wound outer surface 241 of the secondary coil 240 has to have a shape parallel to the axial line S. Therefore, the worker winds the secondary coil 240 while checking whether the outer surface 241 of the secondary coil 240 being wound is parallel to the axial line S. There are many methods capable of knowing whether the outer surface 241 of the secondary coil 240 being wound is parallel to the axial line S. For example, it may be checked by determining "whether the diameter of the outer surface 241 of the secondary coil 240 is constant over the entire length of the bobbin 220" by measuring the diameter of the outer surface 241 of the secondary coil 240 with a measuring tool such as a vernier caliper during the operation of winding the secondary coil 240. That is, when the diameter of the outer surface 241 of the secondary coil 240 is constant over the entire length of the bobbin 220, the outer surface 241 of the secondary coil 240 is naturally parallel to the axial line S due to a geometric structure. Also, as another example, "whether the outer surface 241 of the secondary coil 240 being wound is parallel to the axial line S" may be checked by using a tool that measures parallel configuration or by taking images or photographs in real time.

According to the second embodiment, after the moving portion 210 is provided in the bobbin 220, the linear variable differential transformer 200 is manufactured by sequentially winding the primary coil 230 and the secondary coil 240. However, the present disclosure is not limited thereto. That is, according to the present disclosure, after the primary coil 230 and the secondary coil 240 are wound around the bobbin 220, the moving portion 210 may be provided in the bobbin 220.

Hereinafter, the operation of the linear variable differential transformer 200 according to the second embodiment of the present disclosure will be described.

When the moving portion 210 moves in a state in which an AC voltage is applied to the primary coil 230 at the time of operation, the core 211 causes a voltage difference to occur at both ends of the secondary coil 240. Since the voltage difference is proportional to the displacement of the moving portion 210, a controller (not illustrated) measures the displacement of the moving portion 210 by using the voltage difference.

As described above, in the linear variable differential transformer 200 according to the second embodiment, the outer circumferential surface 220b of the bobbin 220 is formed in a shape inclined symmetrically with respect to the center line C. Therefore, even when the wound thickness of the primary coil 230 is changed in the direction of the axial line S at the time of winding the primary coil 230, the worker may easily make the outer surface 231 of the primary coil 230 in a shape parallel to the axial line S. That is, when the worker winds the primary coil 230, the worker has only to wind the primary coil 230 such that the outer surface 231 of the primary coil 230 is wound in parallel to the axial line S. Therefore, the worker may quickly and easily perform the operation of winding the primary coil 230. That is, in the process of winding the primary coil 230 of the linear variable differential transformer 200, the primary coil 230 may be wound accurately and easily and then the secondary coil 240 may be wound easily, regardless of the skill of workers, thereby implementing high manufacturing process efficiency and high manufacturing yield.

Hereinafter, a linear variable differential transformer 300 according to a third embodiment of the present disclosure will be described with reference to FIGS. 6 and 7.

Figure 6:
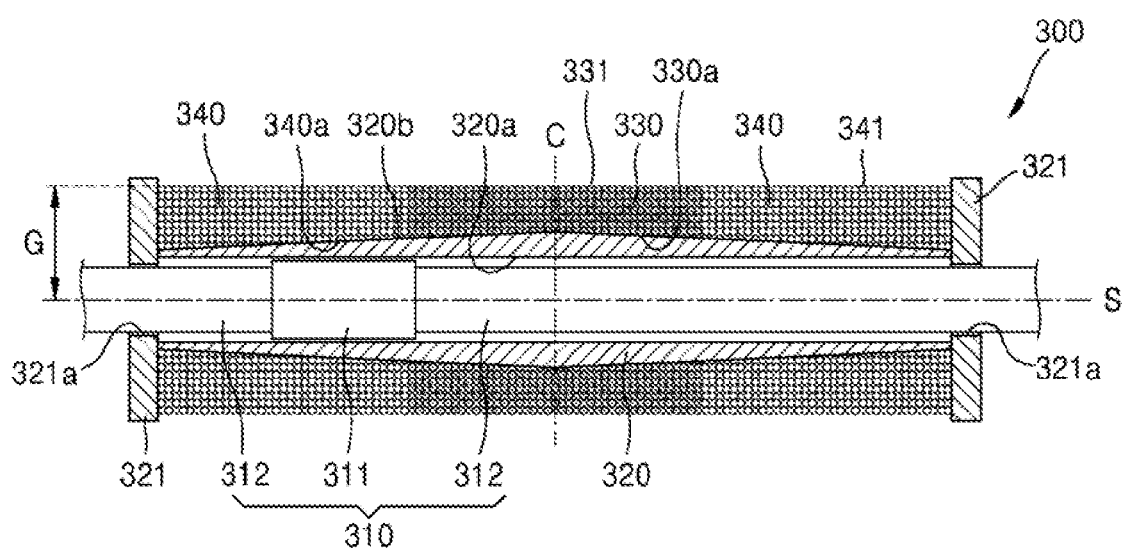
FIG. 6 is a schematic cross-sectional view of a linear variable differential transformer according to a third embodiment of the present disclosure.
Figure 7:
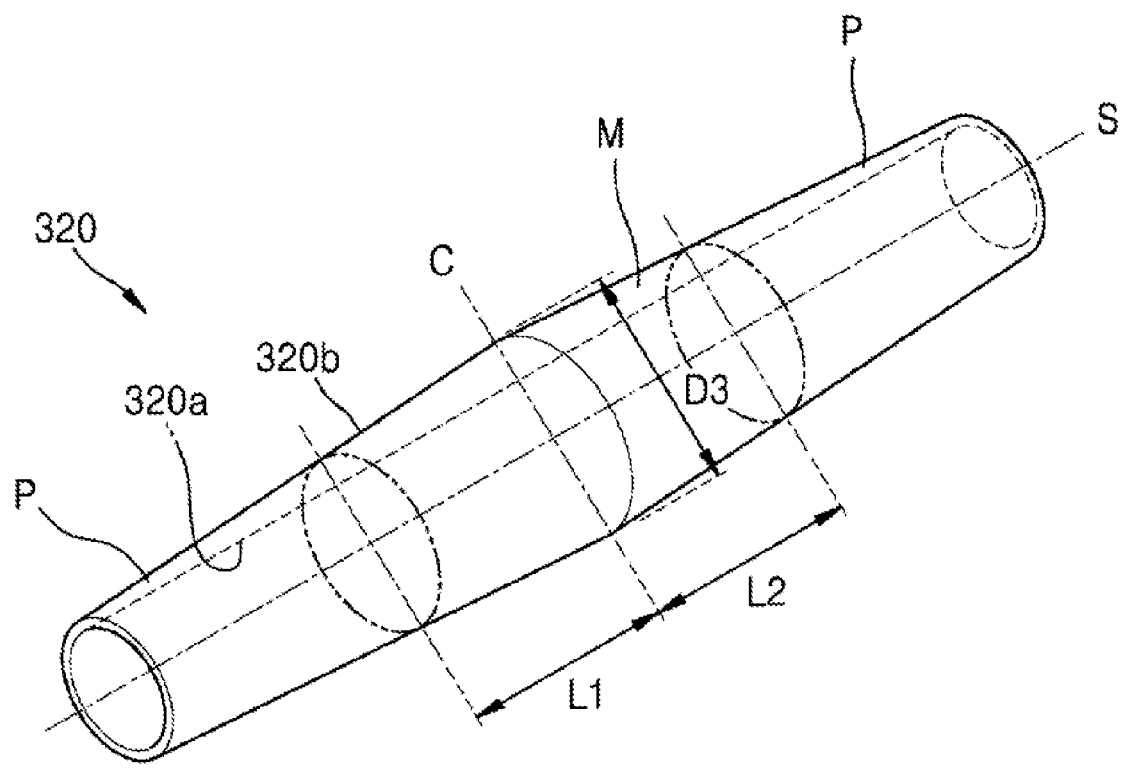
FIG. 7 is a schematic perspective view of a bobbin of the linear variable differential transformer according to the third embodiment of the present disclosure.

FIG. 6 is a schematic cross-sectional view of the linear variable differential transformer according to the third embodiment of the present disclosure, and FIG. 7 is a schematic perspective view of a bobbin of the linear variable differential transformer according to the third embodiment of the present disclosure.

As illustrated in FIG. 6, the linear variable differential transformer 300 according to the third embodiment of the present disclosure includes a moving portion 310, a bobbin 320, a primary coil 330, and a secondary coil 340.

The moving portion 310 includes a core 311 and a core rod 312 and has a rod shape extending in a direction of an axial line S as a whole and having a circular cross-section.

The moving portion 310 according to the third embodiment has the rod shape having the circular cross-section, but the present disclosure is not limited thereto. That is, the shape of the moving portion according to the present disclosure may be variously modified. For example, the moving portion according to the present disclosure may have a beam shape having a rectangular cross-section, or may have a rod shape having an elliptical cross-section.

The core 311 includes a ferromagnetic material and causes electromagnetic interaction with the primary coil 330 and the secondary coil 340.

The core rod 312 supports the core 311. Since a diameter of the core rod 312 is less than a diameter of the core 311, the core rod 312 is configured to slide through a moving hole 321a of a support plate 321.

The bobbin 320 guides the movement of the moving portion 310. To this end, a through hole 320a is formed in the direction of the axial line S such that the moving portion 310 is movable in the direction of the axial line S. That is, at least a part of the moving portion 310 is accommodated in the through hole 320a so as to be slidable.

In addition, the primary coil 330 is wound around a middle portion M of an outer circumferential surface 320b of the bobbin 320, and plate-shaped support plates 321 are provided at both ends of the bobbin 320.

As illustrated in FIG. 3, the middle portion M refers to a region from the center line C to the portions apart toward both sides by distances L1 and L2 in the outer circumferential surface 320b of the bobbin 320. The size of the region of the middle portion M may be designed differently according to the function and characteristics of the linear variable differential transformer 300. In the present embodiment, the distance L1 may be configured to be identical to the distance L2. In the present embodiment, the distance L1 is configured to be identical to the distance L2, but the present disclosure is not limited thereto. The distance L1 may be configured to be different from the distance L2.

The moving hole 321a is formed in the support plate 321, and an inner diameter of the moving hole 321a is less than an inner diameter of the through hole 320a. Therefore, the core 311 does not move through the moving hole 321a, but the core rod 312 is configured to be movable through the moving hole 321a.

According to the third embodiment, the moving holes 321a are formed in all the support plates 321 of the bobbin 320, but the present disclosure is not limited thereto. That is, according to the present disclosure, the moving hole may be formed in only one of the support plates of the bobbin. In this case, the movement of the moving portion is limited by the supporting plates in which the moving hole is not formed.

As illustrated in FIG. 7, the outer circumferential surface 320b of the bobbin 320 has a shape inclined symmetrically with respect to the center line C based on the direction of the axial line S. The center line C is perpendicular to the axial line S.

In particular, the shape of the outer circumferential surface 320b of the bobbin 320 according to the third embodiment is formed such that a diameter D3 of a portion of the bobbin 320 through which the center line C passes is the largest.

The bobbin 320 according to the third embodiment is configured such that the diameter D3 of the portion of the bobbin 320 through which the center line C passes is the largest, but the present disclosure is not limited thereto. That is, the outer circumferential surface of the bobbin according to the present disclosure may have various shapes.

The primary coil 330 is wound around the middle portion M of the outer circumferential surface 320b of the bobbin 320, such that the wound outer surface 331 of the primary coil 330 has a shape parallel to the axial line S.

That the wound outer surface 331 of the primary coil 330 has a shape parallel to the axial line S means that the outer surface 331 of the primary coil 330 is substantially parallel to the axial line S and also includes a case in which there is a slight change in the position of the outer surface 331 of the primary coil 330. The primary coil 330 is actually formed by winding a wire. Therefore, there may be a slight change in the position of the outer surface of the primary coil 330 with respect to parallel configuration during a winding process and the wound surface of the primary coil 330 is also slightly uneven due to the shape of the wire.

Due to the wound shape of the primary coil 330 and the shape of the bobbin 320, a shape of an inner surface 330a of the primary coil 330 facing the bobbin 320 has a shape inclined symmetrically with respect to the center line C based on the direction of the axial line S.

The secondary coil 340 is wound around both sides P of the outer circumferential surface 320b of the bobbin 320. That is, as illustrated in FIG. 6, the secondary coil 340 is wound around portions located at both sides of the primary coil 330, such that the wound outer surface 341 of the secondary coil 340 has a shape parallel to the axial line S.

That the wound outer surface 341 of the secondary coil 340 has a shape parallel to the axial line S means that the outer surface 341 of the secondary coil 340 is substantially parallel to the axial line S and also includes a case in which there is a slight change in the position of the outer surface 341 of the secondary coil 340. The secondary coil 340 is actually formed by winding a wire. Therefore, there may be a slight change in the position of the outer surface of the secondary coil 340 with respect to parallel configuration during a winding process and the wound surface of the secondary coil 340 is also slightly uneven due to the shape of the wire.

Due to the wound shape of the secondary coil 340 and the shape of the bobbin 320, a shape of an inner surface 340a of the secondary coil 340 facing the bobbin 320 has a shape inclined symmetrically with respect to the center line C based on the direction of the axial line S.

The wound outer surface 331 of the primary coil 330 and the wound outer surface 341 of the secondary coil 340 are located at the same distance G from the axial line S. The same distance G from the axial line S may be determined differently according to the function and characteristics of the linear variable differential transformer 300.

That the wound outer surface 331 of the primary coil 330 and the wound outer surface 341 of the secondary coil 340 are located at the same distance G from the axial line S means that the outer surfaces 331 and 341 of the primary coil 330 and the secondary coil 340 are located at substantially the same distance from the axial line S and also includes a case in which there is a slight change in the positions of the outer surfaces 331 and 341 of the primary coil 330 and the secondary coil 340. The primary coil 330 and the secondary coil 340 are actually formed by winding a wire. There may be a slight change in the positions of the outer surfaces of the primary coil 330 and the secondary coil 340 during a winding process and the wound surfaces of the primary coil 330 and the secondary coil 340 are also slightly uneven due to the shape of the wire.

According to the present embodiment, the wound outer surface 331 of the primary coil 330 and the wound outer surface 341 of the secondary coil 340 are located at the same distance G from the axial line S, but the present disclosure is not limited thereto. That is, according to the present disclosure, the wound outer surface 331 of the primary coil 330 and the wound outer surface 341 of the secondary coil 340 may not be located at the same distance from the axial line S according to the type, characteristics, and the like of the manufactured linear variable differential transformer, and the wound outer surface 331 of the primary coil 330 and the wound outer surface 341 of the secondary coil 340 may be designed to have a certain height difference from each other.

According to the third embodiment, no insulating members are present between the bobbin 320 and the primary coil 330, between the bobbin 320 and the secondary coil 340, and between the primary coil 330 and the secondary coil 340, but the present disclosure is not limited thereto. That is, according to the present disclosure, additional insulating members may be present between the bobbin 320 and the primary coil 330, between the bobbin 320 and the secondary coil 340, and between the primary coil 330 and the secondary coil 340.

Since configurations other than the configuration of the linear variable differential transformer 300 described above may use the configuration of the known linear variable differential transformer as it is, a detailed description thereof will be omitted.

Hereinafter, a process of manufacturing the linear variable differential transformer 300 according to the third embodiment of the present disclosure will be described.

First, a manufacturer prepares the moving portion 310 having the core 311 and the core rod 312. After the core 311 is located inside the through hole 320a of the bobbin 320, the support plates 321 are provided at both ends of the bobbin 320.

Subsequently, the manufacturer winds the primary coil 330 around the middle portion M of the outer circumferential surface 320b of the bobbin 320, such that the outer surface 331 of the primary coil 330 has a shape parallel to the axial line S and is located at a distance G from the axial line S.

After winding the primary coil 330, the manufacturer winds the secondary coil 340 around portions of the outer circumferential surface 320b of the bobbin 320, which are located at both sides of the primary coil 330 that are already wound, such that the outer surface 341 of the secondary coil 340 has a shape parallel to the axial line S. In addition, the secondary coil 340 is wound such that the wound outer surface 341 of the secondary coil 340 and the wound outer surface 331 of the primary coil 330 are located at the same distance G from the axial line S. Thus, there is no height difference at the boundary between the wound outer surface 331 of the primary coil 330 and the wound outer surface 341 of the secondary coil 340.

When the primary coil 330 and the secondary coil 340 are wound, the wound outer surfaces 331 and 341 of the primary coil 330 and the secondary coil 340 have to have a shape parallel to the axial line S. Therefore, a worker winds the primary coil 330 and the secondary coil 340 while checking whether the outer surfaces 331 and 341 of the primary coil 330 and the secondary coil 340 being wound are parallel to the axial line S. There are many methods capable of knowing whether the outer surfaces 331 and 341 of the primary coil 330 and the secondary coil 340 being wound are parallel to the axial line S. For example, it may be checked by determining "whether the diameters of the outer surfaces 331 and 341 of the primary coil 330 and the secondary coil 340 are constant over the entire length of the bobbin 320" by measuring the diameters of the outer surfaces 331 and 341 of the primary coil 330 and the secondary coil 340 with a measuring tool such as a vernier caliper during the operation of winding the primary coil 330 and the secondary coil 340. That is, when the diameters of the outer surfaces 331 and 341 of the primary coil 330 and the secondary coil 340 are constant over the entire length of the bobbin 320, it may be seen that the outer surfaces 331 and 341 of the primary coil 330 and the secondary coil 340 are naturally parallel to the axial line S due to a geometric structure, and the wound outer surface 331 of the primary coil 330 and the wound outer surface 341 of the secondary coil 340 are located at the same distance from the axial line S. Also, as another example, "whether the outer surfaces 331 and 341 of the primary coil 330 and the secondary coil 340 being wound are parallel to the axial line S" may be checked by using a tool that measures parallel configuration or by taking images or photographs in real time.

According to the third embodiment, after the moving portion 310 is provided in the bobbin 320, the linear variable differential transformer 300 is manufactured by sequentially winding the primary coil 330 and the secondary coil 340. However, the present disclosure is not limited thereto. The linear variable differential transformer may be manufactured by various methods. For example, after the primary coil 330 and the secondary coil 340 are wound around the bobbin 320, the moving portion 310 may be provided in the bobbin 320. Also, according to the present disclosure, the linear variable differential transformer 300 may be manufactured by winding the secondary coil 340 and then winding the primary coil 330, and the linear variable differential transformer 300 may be manufactured by simultaneously or randomly performing the operation of winding the primary coil 330 and the operation of winding the secondary coil 340.

Hereinafter, the operation of the linear variable differential transformer 300 according to the third embodiment of the present disclosure will be described.

When the moving portion 310 moves in a state in which an AC voltage is applied to the primary coil 330 at the time of operation, the core 311 causes a voltage difference to occur at both ends of the secondary coil 340. Since the voltage difference is proportional to the displacement of the moving portion 310, a controller (not illustrated) measures the displacement of the moving portion 310 by using the voltage difference.

In the description of the linear variable differential transformer 300 according to the third embodiment, the contents of the "reduction of the end effect" provided in the description of the linear variable differential transformers 100 and 200 of the first and second embodiments are omitted. This is because the manufacturer or operator may use a variety of known electric circuits or software so as to reduce the end effect at the time of manufacturing or operating the linear variable differential transformer, and this technology corresponds to a technique for ensuring the linearity of sensors.

As described above, in the linear variable differential transformer 300 according to the third embodiment, the outer circumferential surface 320b of the bobbin 320 is formed in a shape inclined symmetrically with respect to the center line C. Therefore, even when the wound thicknesses of the primary coil 330 and the secondary coil 340 are changed in the direction of the axial line S at the time of winding the primary coil 330 and the secondary coil 340, the worker may easily make the outer surfaces 331 and 341 of the primary coil 330 and the secondary coil 340 in a shape parallel to the axial line S. That is, when performing the operation of winding the primary coil 330 and the secondary coil 340, the worker has only to wind the primary coil 330 and the secondary coil 340 such that the wound outer surfaces 331 and 341 of the primary coil 330 and the secondary coil 340 are parallel to the axial line S. Therefore, the worker may quickly and easily perform the operation of winding the primary coil 330 and the secondary coil 340. That is, in the process of winding the primary coil 330 and the secondary coil 340 of the linear variable differential transformer 300, the worker may accurately and easily wind the primary coil 230 and the secondary coil 340 regardless of the skill of workers, thereby implementing high manufacturing process efficiency and high manufacturing yield.

Hereinafter, a linear variable differential transformer 400 according to a fourth embodiment of the present disclosure will be described with reference to FIGS. 8 and 9.

Figure 8:
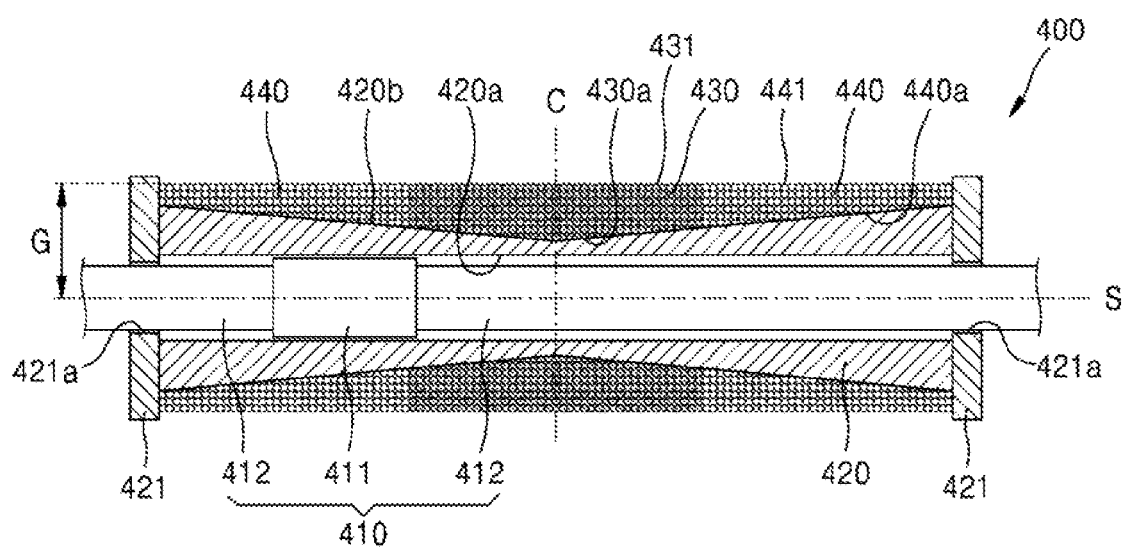
FIG. 8 is a schematic cross-sectional view of a linear variable differential transformer according to a fourth embodiment of the present disclosure.
Figure 9:
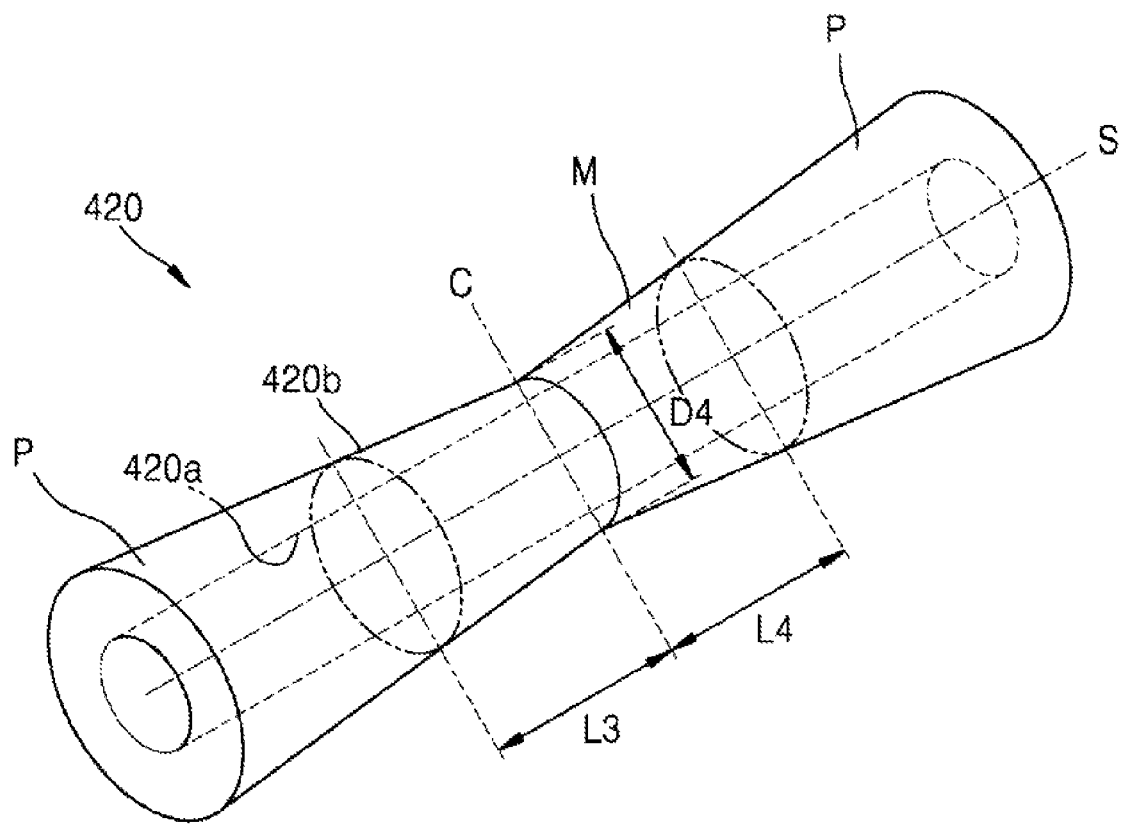
FIG. 9 is a schematic perspective view of a bobbin of the linear variable differential transformer according to the fourth embodiment of the present disclosure.

FIG. 8 is a schematic cross-sectional view of the linear variable differential transformer according to the fourth embodiment of the present disclosure, and FIG. 9 is a schematic perspective view of a bobbin of the linear variable differential transformer according to the fourth embodiment of the present disclosure.

As illustrated in FIG. 8, the linear variable differential transformer 400 according to the fourth embodiment of the present disclosure includes a moving portion 410, a bobbin 420, a primary coil 430, and a secondary coil 440.

The moving portion 410 includes a core 411 and a core rod 412 and has a rod shape extending in a direction of an axial line S as a whole and having a circular cross-section.

The moving portion 410 according to the fourth embodiment has the rod shape having the circular cross-section, but the present disclosure is not limited thereto. That is, the shape of the moving portion according to the present disclosure may be variously modified. For example, the moving portion according to the present disclosure may have a beam shape having a rectangular cross-section, or may have a rod shape having an elliptical cross-section.

The core 411 includes a ferromagnetic material and causes electromagnetic interaction with the primary coil 430 and the secondary coil 440.

The core rod 412 supports the core 411. Since a diameter of the core rod 412 is less than a diameter of the core 411, the core rod 412 is configured to slide through a moving hole 421a of a support plate 421.

The bobbin 420 guides the movement of the moving portion 410. To this end, a through hole 420a is formed in the direction of the axial line S such that the moving portion 410 is movable in the direction of the axial line S. That is, at least a part of the moving portion 410 is accommodated in the through hole 420a so as to be slidable.

Also, the primary coil 430 is wound around a middle portion M of an outer circumferential surface 420b of the bobbin 420, and plate-shaped support plates 421 are provided at both ends of the bobbin 420.

As illustrated in FIG. 9, the middle portion M refers to a region from the center line C to the portions apart toward both sides by distances L3 and L4 in the outer circumferential surface 420b of the bobbin 420. The size of the region of the middle portion M may be determined differently according to the function and characteristics of the linear variable differential transformer 400. In the present embodiment, the distance L3 may be configured to be identical to the distance L4. In the present embodiment, the distance L3 is configured to be identical to the distance L4, but the present disclosure is not limited thereto. The distance L3 may be configured to be different from the distance L4.

The moving hole 421a is formed in the support plate 421, and an inner diameter of the moving hole 421a is less than an inner diameter of the through hole 420a. Therefore, the core 411 does not move through the moving hole 421a, but the core rod 412 is configured to be movable through the moving hole 421a.

According to the fourth embodiment, the moving holes 421a are formed in all the support plates 421 of the bobbin 420 but the present disclosure is not limited thereto. That is, according to the present disclosure, the moving hole may be formed in only one of the support plates of the bobbin. In this case, the movement of the moving portion is limited by the supporting plates in which the moving hole is not formed.

As illustrated in FIG. 9, the outer circumferential surface 420b of the bobbin 420 has a shape inclined symmetrically with respect to the center line C based on the direction of the axial line S. The center line C is perpendicular to the axial line S.

In particular, the shape of the outer circumferential surface 420b of the bobbin 420 according to the fourth embodiment is formed such that a diameter D4 of a portion of the bobbin 420 through which the center line C passes is the smallest. That is, the shape of the outer circumferential surface 420b of the bobbin 420 is configured such that a diameter thereof is increased as a distance from the center line C is increased. Therefore, the bobbin 420 has a double-headed drum with a narrow waist in the middle as a whole.

The bobbin 420 according to the fourth embodiment is configured such that the diameter D4 of the portion of the bobbin 420 through which the center line C passes is the smallest, but the present disclosure is not limited thereto. That is, the outer circumferential surface of the bobbin according to the present disclosure may have various shapes.

The primary coil 430 is wound around the middle portion M of the outer circumferential surface 420b of the bobbin 420, such that the wound outer surface 431 of the primary coil 430 has a shape parallel to the axial line S.

That the wound outer surface 431 of the primary coil 430 has a shape parallel to the axial line S means that the outer surface 431 of the primary coil 430 is substantially parallel to the axial line S and also includes a case in which there is a slight change in the position of the outer surface 431 of the primary coil 430. The primary coil 430 is actually formed by winding a wire. Therefore, there may be a slight change in the position of the outer surface of the primary coil 430 with respect to parallel configuration during a winding process and the wound surface of the primary coil 430 is also slightly uneven due to the shape of the wire.

Due to the wound shape of the primary coil 430 and the shape of the bobbin 420, a shape of an inner surface 430a of the primary coil 430 facing the bobbin 420 has a shape inclined symmetrically with respect to the center line C based on the direction of the axial line S.

The secondary coil 440 is wound around both sides P of the outer circumferential surface 420b of the bobbin 420. That is, as illustrated in FIG. 8, the secondary coil 440 is wound around portions located at both sides of the primary coil 430, such that the wound outer surface 441 of the secondary coil 440 has a shape parallel to the axial line S.

That the wound outer surface 441 of the secondary coil 440 has a shape parallel to the axial line S means that the outer surface 441 of the secondary coil 440 is substantially parallel to the axial line S and also includes a case in which there is a slight change in the position of the outer surface 441 of the secondary coil 440. The secondary coil 440 is actually formed by winding a wire. Therefore, there may be a slight change in the position of the outer surface of the secondary coil 440 with respect to parallel configuration during a winding process and the wound surface of the secondary coil 440 is also slightly uneven due to the shape of the wire.

Due to the wound shape of the secondary coil 440 and the shape of the bobbin 420, a shape of an inner surface 440a of the secondary coil 440 facing the bobbin 420 has a shape inclined symmetrically with respect to the center line C based on the direction of the axial line S.

The wound outer surface 431 of the primary coil 430 and the wound outer surface 441 of the secondary coil 440 are located at the same distance G from the axial line S. The same distance G from the axial line S may be determined differently according to the function and characteristics of the linear variable differential transformer 400.

That the wound outer surface 431 of the primary coil 430 and the wound outer surface 441 of the secondary coil 440 are located at the same distance G from the axial line S means that the outer surfaces 431 and 441 of the primary coil 430 and the secondary coil 440 are located at substantially the same distance from the axial line S and also includes a case in which there is a slight change in the positions of the outer surfaces 431 and 441 of the primary coil 430 and the secondary coil 440. The primary coil 430 and the secondary coil 440 are actually formed by winding a wire. There may be a slight change in the positions of the outer surfaces of the primary coil 330 and the secondary coil 340 during a winding process and the wound surfaces of the primary coil 330 and the secondary coil 340 are also slightly uneven due to the shape of the wire.

According to the present embodiment, the wound outer surface 431 of the primary coil 430 and the wound outer surface 441 of the secondary coil 440 are located at the same distance from the axial line S, but the present disclosure is not limited thereto. That is, according to the present disclosure, the wound outer surface 431 of the primary coil 430 and the wound outer surface 441 of the secondary coil 440 may not be located at the same distance from the axial line S according to the type, characteristics, and the like of the manufactured linear variable differential transformer, and the wound outer surface 431 of the primary coil 430 and the wound outer surface 441 of the secondary coil 440 may be designed to have a certain height difference from each other.

According to the fourth embodiment, no insulating members are present between the bobbin 420 and the primary coil 430, between the bobbin 420 and the secondary coil 440, and between the primary coil 430 and the secondary coil 440, but the present disclosure is not limited thereto. That is, according to the present disclosure, additional insulating members may be present between the bobbin 420 and the primary coil 430, between the bobbin 420 and the secondary coil 440, and between the primary coil 430 and the secondary coil 440.

Since configurations other than the configuration of the linear variable differential transformer 400 described above may use the configuration of the known linear variable differential transformer as it is, a detailed description thereof will be omitted.

Hereinafter, a process of manufacturing the linear variable differential transformer 400 according to the fourth embodiment of the present disclosure will be described.

First, a manufacturer prepares the moving portion 410 having the core 411 and the core rod 412. After the core 411 is located inside the through hole 420a of the bobbin 420, the support plates 421 are provided at both ends of the bobbin 420.

Subsequently, the manufacturer winds the primary coil 430 around the middle portion M of the outer circumferential surface 420b of the bobbin 420, such that the outer surface 431 of the primary coil 430 has a shape parallel to the axial line S and is located at a distance G from the axial line S.

After winding the primary coil 430, the manufacturer winds the secondary coil 440 around portions of the outer circumferential surface 420b of the bobbin 420, which are located at both sides of the primary coil 430 that are already wound, such that the outer surface 441 of the secondary coil 440 has a shape parallel to the axial line S. In addition, the secondary coil 440 is wound such that the wound outer surface 441 of the secondary coil 440 and the wound outer surface 431 of the primary coil 430 are located at the same distance G from the axial line S. Thus, there is no height difference at the boundary between the wound outer surface 431 of the primary coil 430 and the wound outer surface 441 of the secondary coil 440.

When the primary coil 430 and the secondary coil 440 are wound, the wound outer surfaces 431 and 441 of the primary coil 430 and the secondary coil 440 have to have a shape parallel to the axial line S. Therefore, a worker winds the primary coil 430 and the secondary coil 440 while checking whether the outer surfaces 431 and 441 of the primary coil 430 and the secondary coil 440 being wound are parallel to the axial line S. There are many methods capable of knowing whether the outer surfaces 431 and 441 of the primary coil 430 and the secondary coil 440 being wound are parallel to the axial line S. For example, it may be checked by determining "whether the diameters of the outer surfaces 431 and 441 of the primary coil 430 and the secondary coil 440 are constant over the entire length of the bobbin 420" by measuring the diameters of the outer surfaces 431 and 441 of the primary coil 430 and the secondary coil 440 with a measuring tool such as a vernier caliper during the operation of winding the primary coil 430 and the secondary coil 440. That is, when the diameters of the outer surfaces 431 and 441 of the primary coil 430 and the secondary coil 440 are constant over the entire length of the bobbin 420, it may be seen that the outer surfaces 431 and 441 of the primary coil 430 and the secondary coil 440 are naturally parallel to the axial line S due to a geometric structure, and the wound outer surface 431 of the primary coil 430 and the wound outer surface 441 of the secondary coil 440 are located at the same distance from the axial line S. Also, as another example, "whether the outer surfaces 431 and 441 of the primary coil 430 and the secondary coil 440 being wound are parallel to the axial line S" may be checked by using a tool that measures parallel configuration or by taking images or photographs in real time.

According to the fourth embodiment, after the moving portion 410 is provided in the bobbin 420, the linear variable differential transformer 400 is manufactured by sequentially winding the primary coil 430 and the secondary coil 440. However, the present disclosure is not limited thereto. The linear variable differential transformer may be manufactured by various methods. For example, after the primary coil 430 and the secondary coil 440 are wound around the bobbin 420, the moving portion 410 may be provided in the bobbin 420. Also, according to the present disclosure, the linear variable differential transformer 400 may be manufactured by winding the secondary coil 440 and then winding the primary coil 430, and the linear variable differential transformer 400 may be manufactured by simultaneously or randomly performing the operation of winding the primary coil 430 and the operation of winding the secondary coil 440.

Hereinafter, the operation of the linear variable differential transformer 400 according to the fourth embodiment of the present disclosure will be described.

When the moving portion 410 moves in a state in which an AC voltage is applied to the primary coil 430 at the time of operation, the core 411 causes a voltage difference to occur at both ends of the secondary coil 440. Since the voltage difference is proportional to the displacement of the moving portion 410, a controller (not illustrated) measures the displacement of the moving portion 410 by using the voltage difference.

In the description of the linear variable differential transformer 400 according to the fourth embodiment, the contents of the "reduction of the end effect" provided in the description of the linear variable differential transformers 100 and 200 of the first and second embodiments are omitted. This is because the manufacturer or operator may use a variety of known electric circuits or software so as to reduce the end effect at the time of manufacturing or operating the linear variable differential transformer, and this technology corresponds to a technique for ensuring the linearity of sensors.

As described above, in the linear variable differential transformer 400 according to the fourth embodiment, the outer circumferential surface 420b of the bobbin 420 is formed in a shape inclined symmetrically with respect to the center line C. Therefore, even when the wound thicknesses of the primary coil 430 and the secondary coil 440 are changed in the direction of the axial line S at the time of winding the primary coil 430 and the secondary coil 440, the worker may easily make the outer surfaces 431 and 441 of the primary coil 430 and the secondary coil 440 in a shape parallel to the axial line S. That is, when performing the operation of winding the primary coil 430 and the secondary coil 440, the worker has only to wind the primary coil 430 and the secondary coil 440 such that the wound outer surfaces 431 and 441 of the primary coil 430 and the secondary coil 440 are parallel to the axial line S. Therefore, the worker may quickly and easily perform the operation of winding the primary coil 430 and the secondary coil 440. That is, in the process of winding the primary coil 430 and the secondary coil 440 of the linear variable differential transformer 400, the worker may accurately and easily wind the primary coil 430 and the secondary coil 440 regardless of the skill of workers, thereby implementing high manufacturing process efficiency and high manufacturing yield.

While aspects of the present disclosure have been described with reference to the embodiments illustrated in the accompanying drawings, these are merely examples. It will be understood by those of ordinary skill in the art that various modifications and equivalent other embodiments may be made thereto. Therefore, the true scope of protection of the present disclosure should be defined only by the appended claims.

INDUSTRIAL APPLICABILITY

The present disclosure may be applicable to the industry of manufacturing or using linear variable differential transformers.

The invention claimed is:
1. A linear variable differential transformer comprising:
a moving portion having a shape extending in a direction of an axial line;
a bobbin comprising a through hole formed such that the moving portion is movable in the direction of the axial line, an outer circumferential surface of the bobbin having a shape inclined symmetrically with respect to a center line thereof based on the direction of the axial line;
a primary coil wound around the outer circumferential surface of the bobbin; and
a secondary coil wound around the wound primary coil, a wound outer surface of the secondary coil having a shape parallel to the axial line,
wherein a shape of the outer circumferential surface of the bobbin is formed such that a diameter of a portion thereof through which the center line passes is largest.
2. The linear variable differential transformer of claim 1, wherein the primary coil is wound to a constant thickness over the entire length of the bobbin.
3. A linear variable differential transformer comprising:
a moving portion having a shape extending in a direction of an axial line;
a bobbin comprising a through hole formed such that the moving portion is movable in the direction of the axial line, an outer circumferential surface of the bobbin having a shape inclined symmetrically with respect to a center line thereof based on the direction of the axial line;
a primary coil wound around the outer circumferential surface of the bobbin; and
a secondary coil wound around the wound primary coil, a wound outer surface of the secondary coil having a shape parallel to the axial line,
wherein a shape of the outer circumferential surface of the bobbin is formed such that a diameter thereof is increased as a distance from the center line is increased.
4. The linear variable differential transformer of claim 3, wherein a shape of a wound outer surface of the primary coil is parallel to the axial line.
5. The linear variable differential transformer of claim 4, wherein the secondary coil is wound to a constant thickness over the entire length of the bobbin.
6. A linear variable differential transformer comprising:
a moving portion having a shape extending in a direction of an axial line;

a bobbin comprising a through hole formed such that the moving portion is movable in the direction of the axial line, an outer circumferential surface of the bobbin having a shape inclined symmetrically with respect to a center line thereof based on the direction of the axial line;

a primary coil wound around a middle portion of the outer circumferential surface of the bobbin, a wound outer surface of the primary coil having a shape parallel to the axial line; and a secondary coil wound around portions of the outer circumferential surface of the bobbin, which are located at both sides of the primary coil, a wound outer surface of the secondary coil having a shape parallel to the axial line, wherein a shape of the outer circumferential surface of the bobbin is formed such that a diameter of a portion thereof through which the center line passes is largest.

7. The linear variable differential transformer of claim 6, wherein a shape of an inner surface of the primary coil facing the bobbin is inclined symmetrically with respect to a center line thereof based on the direction of the axial line.

8. The linear variable differential transformer of claim 6, wherein a shape of an inner surface of the secondary coil facing the bobbin is inclined symmetrically with respect to a center line thereof based on the direction of the axial line.

9. A linear variable differential transformer comprising:

a moving portion having a shape extending in a direction of an axial line;

a bobbin comprising a through hole formed such that the moving portion is movable in the direction of the axial line, an outer circumferential surface of the bobbin having a shape inclined symmetrically with respect to a center line thereof based on the direction of the axial line;

a primary coil wound around a middle portion of the outer circumferential surface of the bobbin, a wound outer surface of the primary coil having a shape parallel to the axial line; and a secondary coil wound around portions of the outer circumferential surface of the bobbin, which are located at both sides of the primary coil, a wound outer surface of the secondary coil having a shape parallel to the axial line, wherein a shape of the outer circumferential surface of the bobbin is formed such that a diameter thereof is increased as a distance from the center line is increased.

10. The linear variable differential transformer of claim 9, wherein a shape of an inner surface of the primary coil facing the bobbin is inclined symmetrically with respect to a center line thereof based on the direction of the axial line.

11. The linear variable differential transformer of claim 9, wherein a shape of an inner surface of the secondary coil facing the bobbin is inclined symmetrically with respect to a center line thereof based on the direction of the axial line.

12. The linear variable differential transformer of claim 6, wherein the wound outer surface of the primary coil and the wound outer surface of the secondary coil are located at the same distance from the axial line.

13. The linear variable differential transformer of claim 9, wherein the wound outer surface of the primary coil and the wound outer surface of the secondary coil are located at the same distance from the axial line.

* * * * *